United States Patent
Piesch

[19]

[11] Patent Number: 6,157,187
[45] Date of Patent: Dec. 5, 2000

[54] INDUCTIVE WHEEL-SPEED SENSOR FOR AN IMPROVED OUTPUT SIGNAL INDICATIVE OF A ROTATIONAL SPEED OF A MOTOR VEHICLE WHEEL

[75] Inventor: Wolfgang Piesch, Regenstauf, Germany

[73] Assignee: Siemens Aktiengesellschaft, Munich, Germany

[21] Appl. No.: 09/138,350

[22] Filed: Aug. 21, 1998

[30] Foreign Application Priority Data

Aug. 21, 1997 [DE] Germany ............................ 197 36 405

[51] Int. Cl.$^7$ ........................................................ G01P 3/84
[52] U.S. Cl. ............... 324/174; 324/207.15; 324/207.25; 384/448
[58] Field of Search .............................. 324/207.25, 174, 324/163, 173, 207.15, 208, 160, 162, 178, 179; 384/448

[56] References Cited

U.S. PATENT DOCUMENTS

| | | |
|---|---|---|
| 3,947,711 | 3/1976 | Presley et al. . |
| 3,961,214 | 6/1976 | Lokkart . |
| 4,055,090 | 10/1977 | Fuchs ........................................ 73/510 |
| 4,072,364 | 2/1978 | Gundat et al. . |
| 4,983,915 | 1/1991 | Rossi ................................... 324/207.17 |
| 5,023,546 | 6/1991 | Pawlak et al. . |
| 5,023,547 | 6/1991 | Pawlak et al. . |
| 5,291,130 | 3/1994 | Kendzior ................................ 324/174 |
| 5,363,829 | 11/1994 | Onisawa et al. . |

FOREIGN PATENT DOCUMENTS

| | | |
|---|---|---|
| 0 044 749 A1 | 1/1982 | European Pat. Off. . |
| 0 609 716 A1 | 8/1994 | European Pat. Off. . |
| 0 609 716A1 | 8/1994 | European Pat. Off. . |
| 2 274 920 | 1/1976 | France . |
| 2243331 | 3/1974 | Germany . |
| 2549212C2 | 2/1987 | Germany . |
| 44 46 526 A1 | 6/1996 | Germany . |
| 2299674 | 9/1996 | United Kingdom . |
| 2 299 674 | 10/1996 | United Kingdom . |
| 2 303 214 | 2/1997 | United Kingdom . |

*Primary Examiner*—Jay Patidar
*Assistant Examiner*—Subhash Zaveri
*Attorney, Agent, or Firm*—Herbert L. Lerner; Laurence A. Greenberg; Werner H. Stemer

[57] ABSTRACT

The inductive wheel-speed sensor registers the rotational speed of a motor vehicle wheel. The wheel is mounted on a hub, which is rotatably mounted on an axle journal. The sensor has a transmitter wheel that rotates with the wheel and that is formed by a sequence of regions of magnetizable material separated from one another by regions of non-magnetizable or barely magnetizable material. Two magnets are stationarily mounted such that their magnetic flux varies as the magnetized and non-magnetized portions of the transmitter wheel pass by, as the wheel rotates. The variation depends on the rotational speed. The magnetic flux change in the two (or more) magnets is registered coils which are disposed in the vicinity of the magnets. The output signal of the coils is fed to an evaluation device. Mounting is facilitated, an improved signal is provided, and temperature influences due to braking are reduced in that the transmitter wheel is disposed outside of the hub, remote from the wheel, and the magnet and coil pairs are mounted on the axle journal immediately adjacent to the transmitter wheel but separated from the latter by a narrow gap. The magnets are spaced from one another such that one magnet faces a magnetizable region while the other magnet faces a non-magnetizable region of the transmitter wheel.

4 Claims, 2 Drawing Sheets

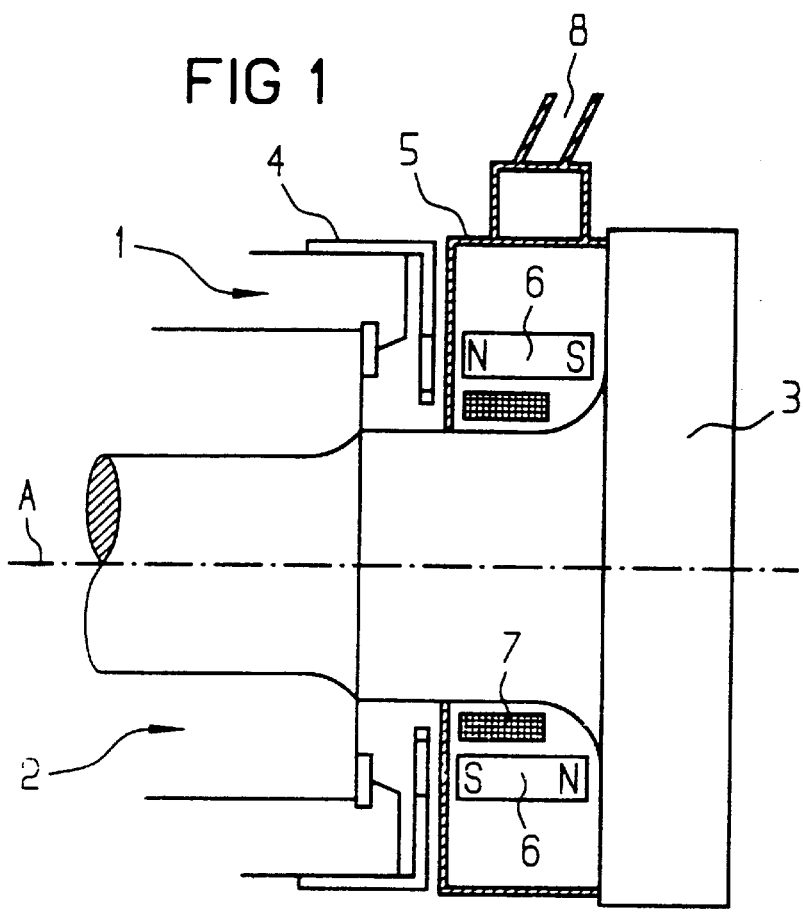
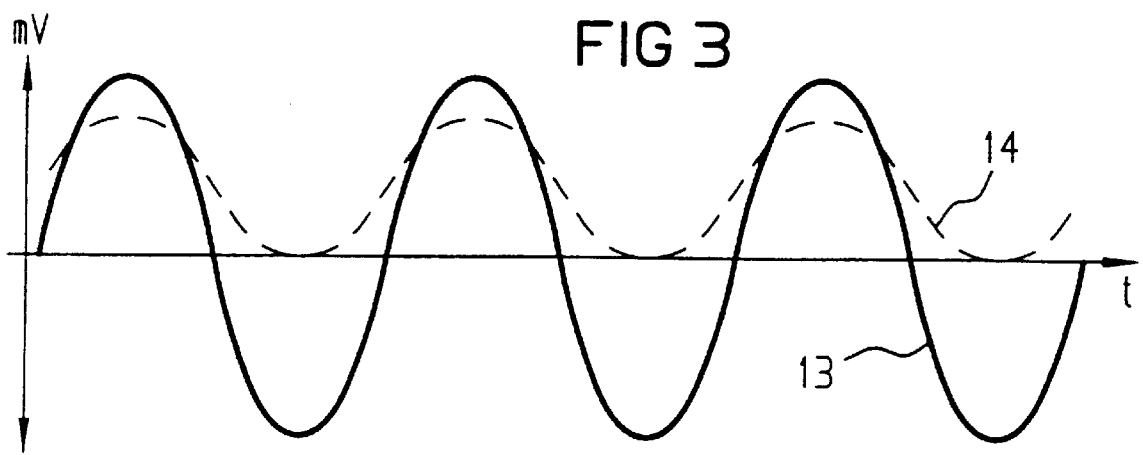

INDUCTIVE WHEEL-SPEED SENSOR FOR AN IMPROVED OUTPUT SIGNAL INDICATIVE OF A ROTATIONAL SPEED OF A MOTOR VEHICLE WHEEL

BACKGROUND OF THE INVENTION

FIELD OF THE INVENTION

The invention pertains to an inductive rotational-speed transmitter for registering the rotational speed of a motor vehicle wheel with a hub that is rotatably mounted via the hub on an axle journal. The wheel-speed sensor comprises a transmitter wheel connected to the wheel and formed by a sequence of regions of magnetizable material that are separated from one another by regions of non-magnetizable or barely magnetizable material. A magnet is non-rotatably mounted and its magnetic flux is varied by the transmitter wheel, in dependence on the rotational speed, as the wheel rotates. The magnetic flux change is registered by a coil disposed in the vicinity of the magnet and a corresponding signal is fed to an evaluation device.

A rotational-speed transmitter of that generic type is disclosed in U.S. Pat. No. 5,291,130 to J. Kendzior, entitled "Vehicle Wheel Speed Sensor Employing an Adaptable Rotor Cap" (corresponding European publication EP 0 609 716). The prior art configuration has the disadvantage that the output signal can be very difficult to evaluate, since the sinusoidal voltage caused by the magnetic field change does not have a sufficiently large amplitude to form a signal that is capable of differentiation.

SUMMARY OF THE INVENTION

It is accordingly an object of the invention to provide an inductive wheel-speed sensor for measuring the rotational speed of a vehicle wheel, which overcomes the above-mentioned disadvantages of the prior art devices and methods of this general type and which generates an oscillatory voltage waveform that permits good signal evaluation.

With the foregoing and other objects in view there is provided, in accordance with the invention, an inductive wheel-speed sensor for measuring a rotational speed of a motor vehicle wheel mounted on a hub that is rotatably mounted on an axle journal, comprising:

a transmitter wheel rigidly mounted on a hub remote from a wheel mounted on the hub, the transmitter wheel being formed with a multiplicity of regions of magnetizable material separated from one another by regions of substantially non-magnetizable (not or only barely magnetizable) material, and rotating with the motor vehicle wheel;

at least two non-rotatably mounted magnets disposed in immediate vicinity of the transmitter wheel and separated therefrom by a predefined spacing distance such that a magnetic flux of the magnets is varied by the transmitter wheel as the transmitter wheel rotates with the motor vehicle wheel;

at least two coils mounted in immediate vicinity of the magnets so that a change in the magnetic flux through the magnets is registered by the coils, the coils outputting an output signal;

the magnets extending substantially parallel to a rotational axis of the wheel and having mutually opposite polarity, and the magnets being spaced apart such that a first of the magnets aligns with one of the regions of magnetizable material which a second one of the magnets aligns with one of the regions of substantially non-magnetizable material.

In other words, the object of the invention is satisfied in that the transmitter wheel is arranged on the outside of the hub, remote from the wheel, and by at least two magnets and two associated coils non-rotatably mounted on the axle journal immediately adjacent to the transmitter wheel but separated from the latter by a narrow gap. The at least two magnets extend in the axial direction of the wheel axle and are of opposed polarity. They are arranged in such a way that when the first magnet aligns with a region of magnetizable material, then the second magnet aligns with a region of non-magnetizable or barely magnetizable material, or vice versa.

As a result of this configuration, an optimally evaluable output signal is obtained.

In accordance with an added feature of the invention, an annular housing is placed onto the axle journal and surrounding the axle journal, the housing housing the at least two magnets and the at least two coils.

In accordance with a concomitant feature of the invention, the housing is pressed onto the axle journal.

Other features which are considered as characteristic for the invention are set forth in the appended claims.

Although the invention is illustrated and described herein as embodied in an inductive rotational-speed transmitter for registering the rotational speed of a motor vehicle wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic view of a rotational-speed sensor mounted at the wheel of a motor vehicle;

FIG. 3 is a graph illustrating a signal waveform at the output as a function of the time.

DESCRIPTION OF THE PREFERRED EMBODIMENTS

Figure 2A:
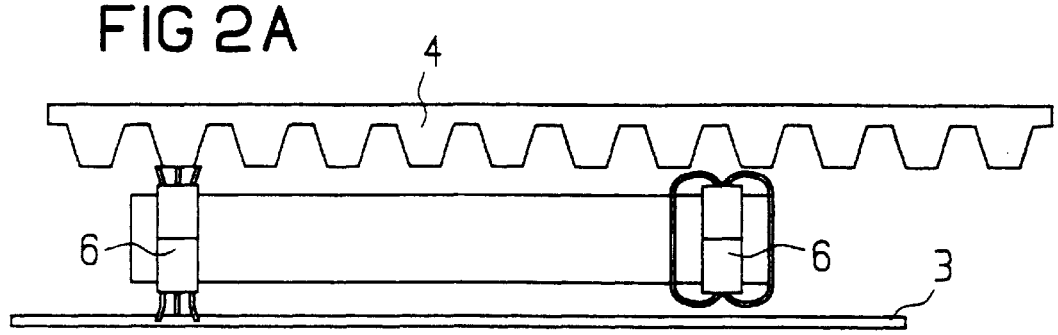
FIGS. 2A to 2C are partial schematic views of relative position of two magnets in relation to the transmitter wheel in three successive movement phases.

Referring now to the figures of the drawing in detail and first, particularly, to FIG. 1 thereof, there is seen a schematic of a hub 1 of a motor vehicle wheel, which is mounted via a wheel bearing 2 on an axle journal 3. A transmitter wheel 4 is fastened to the hub 1. A housing 5 is pressed onto the axle journal at a defined spacing gap with respect to the transmitter wheel.

Two magnets 6 are disposed in the housing 5. The two magnets 6 have opposed polarity and they extend parallel to a longitudinal axis A of the wheel axle. Coils 7 are operatively assigned to the magnets 6 so that they detect the magnetic flux and, as a function of the voltage thus induced in the coils, provide a signal at an output terminal 8.

FIG. 2 depicts—in a developed view—the relative position of the magnets 6 and of the transmitter wheel 4. The transmitter wheel is similar to a gear wheel and it is essentially a sun gear with regions 9 with magnetizable material and alternating with regions 10 in which there is no magnetizable material or only barely magnetizable material.

The magnets 6 are oppositely polarized and their relative spacing is adapted to the spacing between the teeth 9 on the transmitter wheel 4 such that in each case one magnet 6 is adjacent to a region 9 with the magnetic material and the respective other magnet 6 is adjacent to a region 10 without magnetic material.

Figure 2B:
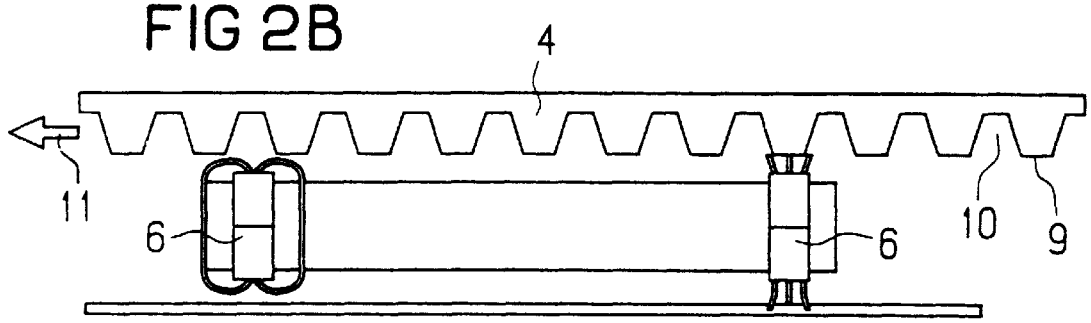
Figure 2C:
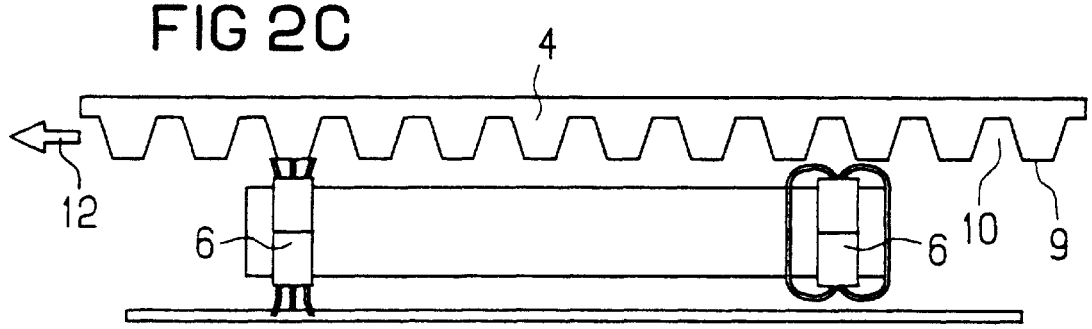

Starting from FIG. 2A, a relative movement in the direction of the arrow 11 is depicted in FIG. 2B, and a further relative movement in the direction of the arrow 12 is depicted in FIG. 2C.

The two magnets alternately produce a closed magnetic circuit.

The voltage signal generated in this way is illustrated in FIG. 3 and graphed over time. A signal 13 (solid line) originates from the novel rotational-speed transmitter. A signal 14 (dashed line) originates from a rotational-speed transmitter of the prior art. It becomes amply evident, from a comparison of the signals, that the novel signal can obviously be evaluated better.

I claim:

1. An inductive wheel-speed sensor for measuring a rotational speed of a motor vehicle wheel mounted on a hub which is rotatably mounted on an axle journal, comprising:

a transmitter wheel rigidly mounted on a hub remote from a wheel mounted on the hub, said transmitter wheel being formed with a multiplicity of regions of magnetizable material separated from one another by regions of substantially non-magnetizable material, and rotating with the motor vehicle wheel;

at least two non-rotatably mounted magnets disposed in immediate vicinity of said transmitter wheel and separated therefrom by a predefined spacing distance such that a magnetic flux of said magnets is varied by said transmitter wheel as the transmitter wheel rotates with the motor vehicle wheel;

at least two coils mounted in immediate vicinity of said magnets so that a change in the magnetic flux through said magnets is registered by said coils, said coils outputting an output signal;

said magnets extending substantially parallel to a rotational axis of the wheel and having mutually opposite polarity, and said magnets being spaced apart such that a first of said magnets aligns with one of said regions of magnetizable material when a second one of said magnets aligns with one of said regions of substantially non-magnetizable material.

2. The wheel-speed sensor according to claim 1, wherein said substantially non-magnetizable material is a barely magnetizable material.

3. The wheel-speed sensor according to claim 1, which further comprises an annular housing placed onto the axle journal and surrounding the axle journal, said at least two magnets and said at least two coils disposed in said housing.

4. The wheel-speed sensor according to claim 3, wherein said housing is pressed onto the axle journal.

* * * * *